Dec. 28, 1943.　　　W. WALLER, JR　　　2,337,787
MARINE SHOCK ABSORBER
Filed June 1, 1942　　　2 Sheets-Sheet 1
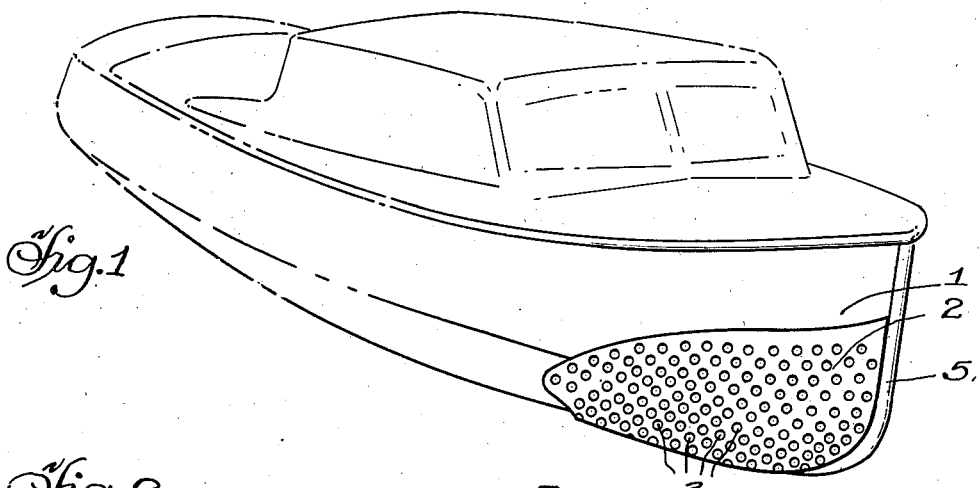
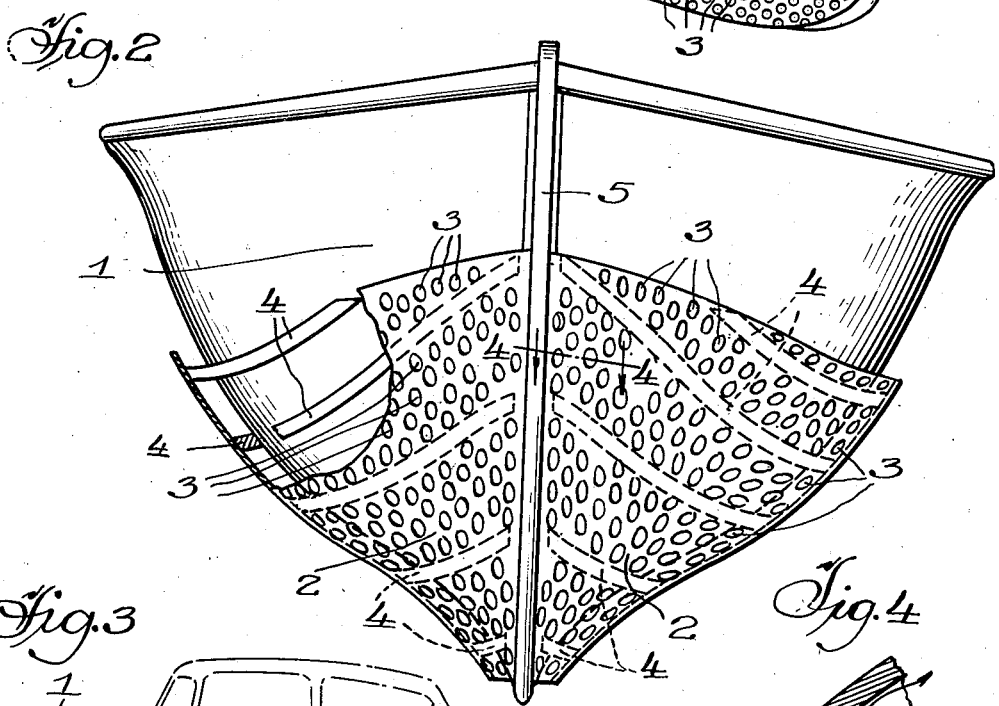
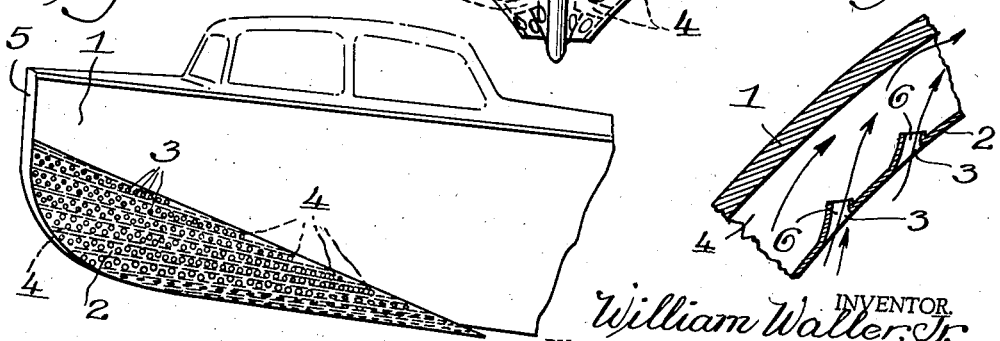
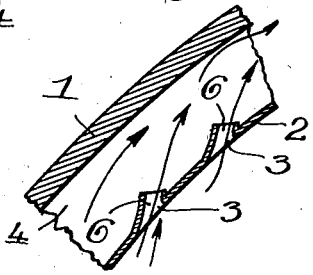
INVENTOR.
William Waller, Jr.
BY Louis A. Bisson,
Atty Dec. 28, 1943.   W. WALLER, JR   2,337,787
MARINE SHOCK ABSORBER
Filed June 1, 1942   2 Sheets-Sheet 2

INVENTOR.
BY William Waller Jr.
Louis A. Bisson, Atty

Patented Dec. 28, 1943

2,337,787

UNITED STATES PATENT OFFICE 2,337,787

MARINE SHOCK ABSORBER

William Waller, Jr., Chicago, Ill.

Application June 1, 1942, Serial No. 445,278

5 Claims. (Cl. 114—219)

The present invention relates to marine crafts and more particularly to the problem of traveling effectively and safely in a wavy or choppy sea at high velocity.

Fast travel of marine craft is not only desirable but a practical necessity. To do so safely for the craft and its occupants on a sea with waves has been limited. That is by reason of the fact that when the prow of the craft, at high speed, hits the wave the shock is not only instantaneous but is like when striking against a solid wall. Since water is incompressible the striking of the prow of a boat or similar marine craft moving at high speed against a wave of solid water, usually called green water, acts to momentarily stop the craft thus destroying its momentum with attendant damage of the craft and injury to its occupants. If the water be mixed with air the latter acts as a yieldable cushion and the progress of the craft is not appreciably nor perceptibly retarded and shocked.

Among the objects of the invention is to provide a novel means for reducing and substantially eliminating shock and retardation of the fast progress of the craft, as by having an auxiliary prow segment or baffle in spaced relation to the prow proper of the craft and capable of absorbing shock by offering a discontinuous surface of contact with the wave and instantly breaking up the water with air which cushions the prow proper of the craft. The baffle is designed with openings for the passage therethrough of the green water and for mixing of the water with air forwardly of the prow proper of the craft to cushion it and to flow or slip along the prow and rearwardly thereof. The baffle also may be flexible or resiliently yieldable to further aid the absorption of the shock.

Other objects, advantages, capabilities and features are comprehended by the invention as will later appear and as are inherently possessed by the invention.

Referring to the drawings:

Fig. 1 is a perspective view of a craft embodying an illustrative form of the invention;

Fig. 2 is a front end view thereof, on an enlarged scale, with a part broken away to show internal structure;

Fig. 3 is a fragmentary side elevational view thereof;

Fig. 4 is a fragmentary sectional view, on an enlarged scale, taken in a plane represented by line 4—4 in Fig. 2 of the drawings;

Figure 5:
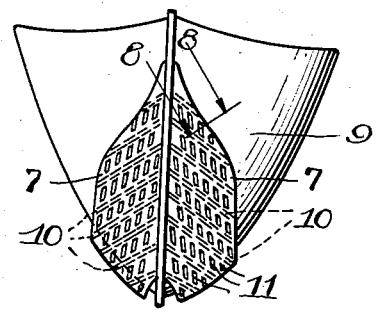
Fig. 5 is a front end view in elevation of the invention with an alternative form of baffle.
Figure 6:
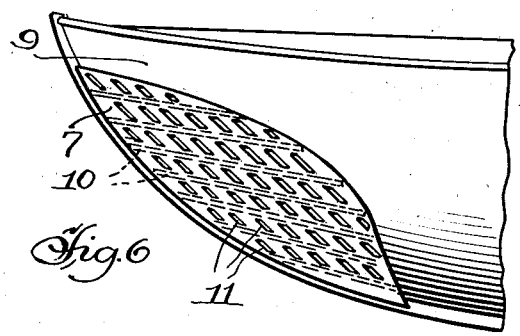
Fig. 6 is a fragmentary side elevational view of the same end, showing a different shaped prow.
Figure 8:
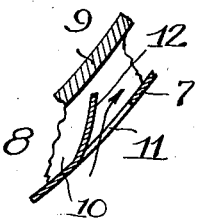
Fig. 8 is a fragmentary sectional view, on an enlarged scale, taken in a plane represented by line 8—8 in Fig. 5 of the drawings.
Figure 7:
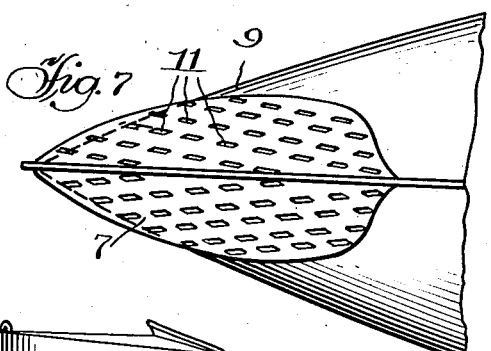
Fig. 7 is a bottom plan view of the structure shown in Fig. 6.

Referring more in detail to the drawings the embodiments chosen to illustrate the invention are shown (see Figs. 1–4) applied to the prow or bow portion 1 of a marine craft in the form of a baffle or shield 2 constituting an auxiliary prow segment, which may be of sheet material, such as metal, provided with numerous openings 3 or the like, and suitable spacing means 4 secured to the prow 1 and connected to the baffle or shield 2, in any suitable manner by any suitable means. The spacing means may be in the form of elongated members 4 spaced from each other, as shown, and extending from the stem 5 rearwardly and downwardly and about the surface of the prow. The portions of the baffle 2 between these spacing members 4 may be and are preferably resilient so as to have a certain degree of give or flexing when hitting the green water of a wave. Even the spacing members 4 also may be somewhat resiliently yieldable for the same purpose.

Referring to Fig. 4 the openings 3 may open into throats or nozzles 6 extending rearwardly to direct the flow of water passing through the openings 3 into the space between the baffle 2 and the prow 1, as shown by the arrows in Fig. 4. As the streams jet through these nozzles 6 they will mix with air and set up an aerated mass in the space or passage between the baffle 2 and the prow 1 and also between the spacers 4, this aerated mass being resilient or yieldable so as to absorb the shock and thus not retard the progress of the craft but allow it to proceed smoothly. The aerated mass will pass out at the rear ends of the passageways between the spacers 4.

In Figs. 5 to 10, inclusive, are shown baffles 7 and 8, similar to that shown in Figs. 1–4, but applied to different shaped prows 9 and 9a (Figs.

Figure 9:
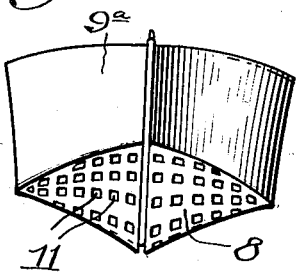
Fig. 9 is a front end view in elevation of the invention applied to a hull of different shape.
Figure 10:
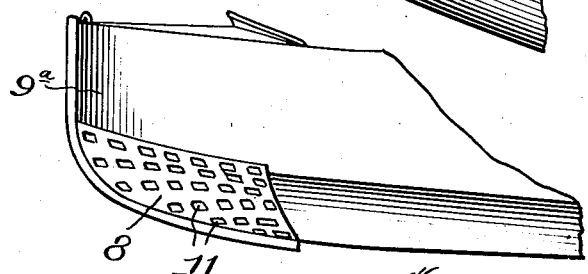
Fig. 10 is a fragmentary side elevational view of the same.

5-7 and Figs. 9-10). These baffles are likewise spaced from the prows, as by spacing elements 10, and also have numerous openings 11 for the passage of water into the space between the prow and the baffle. These openings 11 (see Fig. 8) may be formed by striking a tongue portion 12 from the baffle 7 to form a guide for the inflow of the water as shown by the arrow.

Figure 11:
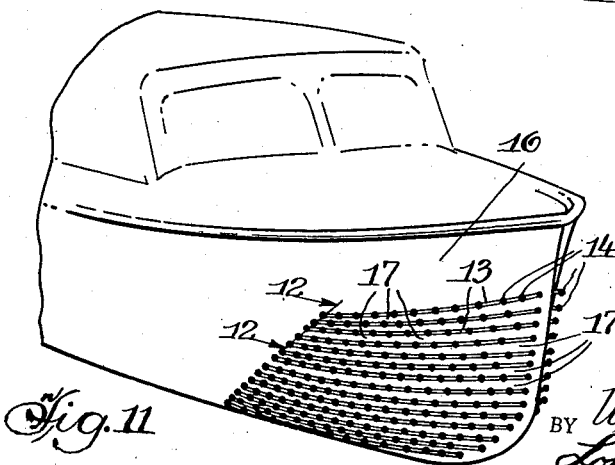
Fig. 11 is a view in perspective of the forward portion of a craft to which is applied a further alternative form of the invention; and, Fig. 12 is a fragmentary sectional view, on an enlarged scale, taken in a plane represented by line 12—12 in Fig. 11 of the drawings.
Figure 12:
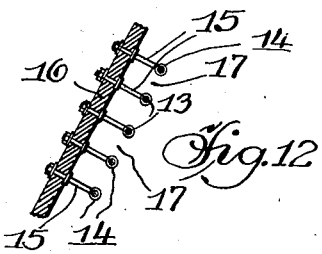

In Figs. 11 and 12 is shown an alternative form of baffle comprising a series of resilient elements 13, which may be in the form of rope, as wire rope, extending through openings or eyes 14 of spacing elements 15 suitably secured to the wall portion of the prow 16, as shown in particular in Fig. 12. The linear spaces between these ropes 13 provide openings 17 through which the water passes into the space between the ropes 13 as an aggregate and the wall of the prow 16 in the same way as in the forms shown in Figs. 1 to 10, inclusive.

In use when the craft is moving at high speed in waves the baffle on hitting green water will cut into the water and allow water to pass through the openings in the baffle and to churn or mix with air so that the aerated mass cushions the prow and also slides rearwardly in the space between the baffle and the prow, thus absorbing shock and not retarding the progress of the craft. The baffle will also have a certain amount of mechanical give due to its resilient characteristic.

While I have herein described and on the drawings shown a few illustrative embodiments of the invention it is to be understood that the invention is not limited thereto but comprehends other constructions, details, arrangements of parts, and features without departing from the spirit of the invention.

Having thus disclosed the invention, I claim:

1. A shock absorber for marine craft comprising a baffle wall located spacedly relative to the lower portion of the prow of the craft for hitting waves as the craft proceeds, means connected to said baffle and to said prow for maintaining said baffle in said spaced relation, said baffle having openings throughout the extent of the baffle for the passage of water and for producing a cushion of air and water adjacent the prow, portions of said baffle between said means for maintaining the baffle in spaced relation being resiliently yieldable to absorb part of the shock of contact with the waves.

2. A shock absorber for marine craft comprising a baffle wall located spacedly relative to the lower portion of the prow of the craft for hitting waves as the craft proceeds, means connected to said baffle and to said prow for maintaining said baffle in said spaced relation, said baffle having openings throughout the extent of the baffle for the passage of water and for producing a cushion of air and water adjacent the prow, said means for maintaining the baffle in spaced relation comprising spacing members which are spaced from each other and which extend rearwardly and about the contour of the prow.

3. A shock absorber for marine craft comprising a baffle wall located spacedly relative to the lower portion of the prow of the craft for hitting waves as the craft proceeds, means connected to said baffle and to said prow for maintaining said baffle in said spaced relation, said baffle having openings throughout the extent of the baffle for the passage of water and for producing a cushion of air and water adjacent the prow, said baffle having at said openings inwardly and rearwardly extending guiding portions for guiding the water into the space between the prow and the baffle.

4. A shock absorber for marine craft comprising a baffle wall located spacedly relative to the lower portion of the prow of the craft for hitting waves as the craft proceeds, means connected to said baffle and to said prow for maintaining said baffle in said spaced relation, said baffle having openings throughout the extent of the baffle for the passage of water and for producing a cushion of air and water adjacent the prow, said means for maintaining the baffle in spaced relation comprising spacing members which are spaced from each other and which extend rearwardly and about the contour of the prow, said spacing members comprising series of elements secured to the prow and connected to the baffle.

5. A shock absorber for marine craft comprising a baffle wall located spacedly relative to the lower portion of the prow of the craft for hitting waves as the craft proceeds, means connected to said baffle and to said prow for maintaining said baffle in said spaced relation, said baffle having openings throughout the extent of the baffle for the passage of water and for producing a cushion of air and water adjacent the prow, said means for maintaining the baffle in spaced relation comprising spacing members which are spaced from each other and which extend rearwardly and about the contour of the prow, said spacing members comprising series of elements secured to the prow and connected to the baffle, said elements being provided at their outer ends with apertures, and said baffle comprising rope-like pieces extending through said apertured outer end portions of said elements.

WILLIAM WALLER, Jr.